US012632052B2

(12) United States Patent
Ross et al.

(10) Patent No.: US 12,632,052 B2
(45) Date of Patent: May 19, 2026

(54) DEVICE AND METHOD FOR CONTROLLING A ROBOT

(71) Applicant: Robert Bosch GmbH, Stuttgart (DE)

(72) Inventors: Chana Ross, Zichron Yaakov (IL); Yakov Miron, Haifa (IL); Yuval Goldfracht, Haifa (IL); Dotan Di Castro, Haifa (IL)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 18/362,311

(22) Filed: Jul. 31, 2023

(65) Prior Publication Data

US 2024/0045434 A1     Feb. 8, 2024

(30) Foreign Application Priority Data

Aug. 3, 2022     (DE) ..................... 10 2022 208 089.0

(51) Int. Cl.
  *G05D 1/00*          (2024.01)
  *G06F 18/25*         (2023.01)
(52) U.S. Cl.
  CPC ......... *G05D 1/0221* (2013.01); *G05D 1/0246* (2013.01); *G05D 1/027* (2013.01); *G06F 18/25* (2023.01)
(58) Field of Classification Search
  CPC .... G05D 1/0221; G05D 1/0246; G05D 1/027; G05D 1/249; G05D 1/648; G05D 1/2469; G05D 2101/15; G05D 2105/05; G05D 2107/90; G05D 2109/10; G06F 18/25; G06N 3/006; G06N 20/00; G06V 10/774; G06V 10/82; G06V 20/10; G06V 20/52;
  (Continued)

(56) References Cited

U.S. PATENT DOCUMENTS

2020/0209858 A1* 7/2020 Trofymov ................ G06N 3/08
2020/0363810 A1* 11/2020 Arras ................ G01C 21/3446
(Continued)

FOREIGN PATENT DOCUMENTS

CN            111890351 A  * 11/2020
DE    10 2019 131 385 A1     5/2020
(Continued)

OTHER PUBLICATIONS

Yao, "Multi-Sensor State Estimation Fusion on Quadruped Robot Locomotion", arXiv, 2020 (Year: 2020).*
(Continued)

*Primary Examiner* — Tiffany P Young
*Assistant Examiner* — Shien Ming Chou
(74) *Attorney, Agent, or Firm* — Maginot, Moore & Beck LLP

(57)                ABSTRACT

A method for training a control policy for a robot device includes acquiring a reference state of an environment of the robot device and a reference observation of the environment for the reference state. The method also includes generating, for each of a plurality of errors of an estimation of a pose of the robot device, an observation that is disturbed with respect to the reference observation according to the error of the pose estimation and a training data element comprising the generated observation as a training input. The method further includes training the control policy using the generated training data elements.

8 Claims, 5 Drawing Sheets

(58) Field of Classification Search
CPC ... B25J 9/16; B25J 9/1679; B25J 9/163; B25J
9/1653; B25J 9/1694; B25J 13/08
USPC .......................................................... 701/25
See application file for complete search history.

(56) References Cited

U.S. PATENT DOCUMENTS

| | | | | |
|---|---|---|---|---|
| 2021/0072397 | A1* | 3/2021 | Caspers | ................ G01S 17/931 |
| 2022/0114805 | A1* | 4/2022 | Jarquin Arroyo | ...... G06V 10/32 |
| 2022/0379492 | A1* | 12/2022 | Ito | .......................... G06N 20/00 |

FOREIGN PATENT DOCUMENTS

| | | | |
|---|---|---|---|
| DE | 10 2019 200 435 | A1 | 7/2020 |
| DE | 10 2019 209 616 | A1 | 1/2021 |
| DE | 10 2021 103 272 | A1 | 8/2021 |
| DE | 11 2017 008 089 | B4 | 11/2021 |
| DE | 10 2020 134 344 | A1 | 12/2021 |
| DE | 10 2020 212 658 | A1 | 4/2022 |
| DE | 10 2020 214 177 | A1 | 5/2022 |
| DE | 10 2020 103 854 | B4 | 6/2022 |
| DE | 11 2020 004 135 | T5 | 6/2022 |
| JP | 2010-152787 | A | 7/2010 |
| JP | 2022-106924 | A | 7/2022 |
| KR | 10-2020-0063538 | A | 6/2020 |

OTHER PUBLICATIONS

Montantes, "What You Need to Know About Deep Reinforcement Learning", Medium.com, 2020 (Year: 2020).*

* cited by examiner

FIG. 2C
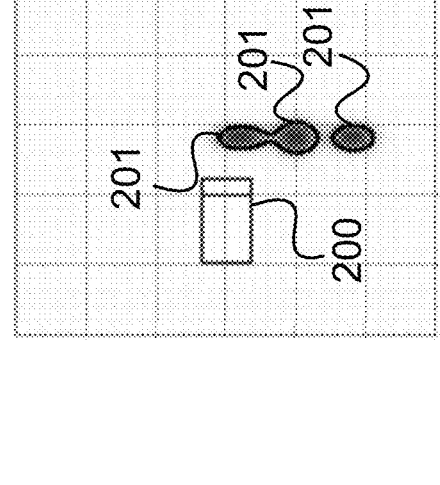
FIG. 2B
FIG. 2A
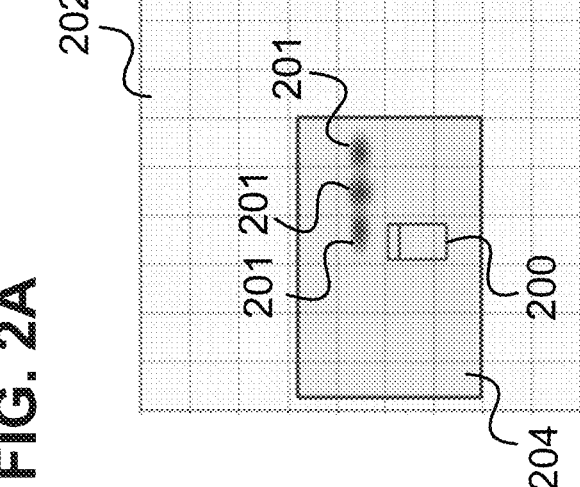

305

304

303

302

301

306

307

308

308

300

DEVICE AND METHOD FOR CONTROLLING A ROBOT

This application claims priority under 35 U.S.C. § 119 to patent application no. DE 10 2022 208 089.0, filed on Aug. 3, 2022 in Germany, the disclosure of which is incorporated herein by reference in its entirety.

The disclosure relates to devices and methods for controlling a robot.

BACKGROUND

In recent years, there has been a growing demand for automation in construction sites, which suffer from labour shortage due to various reasons. First, automation can increase productivity, which has been fairly stagnant in the last few decades, and cut down the inflating costs. Second, it can improve the workers safety by allowing machines to handle the risky tasks and therefore keeping the workers out of harm's way. Third, it can help reduce the required manual labour from the workers and thus help resolve the labour shortage.

However, construction sites are unpredictable and unstructured environments by nature, where multiple machines work simultaneously, on a variety of challenging tasks. In addition, construction projects are also extremely varied as each project is tailored to a specific architectural design, specifications etc. For these reasons, automation in construction sites is a difficult task.

For example, data collection for training, which is the backbone of current machine learning methods for autonomous driving, proves to be extremely challenging in the unstructured environment of construction site, where safety, time, and costs are the major practical considerations. This problem can be partially solved using simulators. These have their drawbacks, however. In addition, the unpredictable nature of the construction environment, where extreme and dangerous scenarios happen frequently, proves to be difficult to model and learn using standard methods for autonomous vehicles.

Therefore, approaches for training a control policy for a robot device in unstructured environments like a construction site are desirable.

SUMMARY

According to various embodiments, a method for training a control policy for a robot device is provided comprising acquiring a reference state of an environment of the robot device and a reference observation of the environment for the reference state, generating, for each of a plurality of errors of an estimation of a pose of the robot device, an observation that is disturbed with respect to the reference observation according to the error of the pose estimation and a training data element comprising the generated observation as training input and training the control policy using the generated training data elements.

The method described above allows training of a control policy (or agent) of a robot device such that the control policy is robust against errors in pose estimation and can thus achieve good results in a difficult (unstructured) environment such as a construction site. The generated observations can be seen to correspond to training poses wherein each training pose differs from the correct pose by the respective error.

One or more reference actions (generated for the reference observation, coming for example from expert knowledge such as a demonstration) may for example be used as target output for the generated observations, i.e. the observations which are wrong in the sense that they correspond to wrong pose estimations, as the actions to be perform such that the robot device is trained to perform the "correct" actions even if it makes errors in its pose estimation. The target output of a training data element (i.e. ground truth label) may also be generated by an expert, e.g. a expert model acting as "teacher".

The observation (e.g. a height map) is for example generated such that the robot device, if its estimated pose was its true pose in a state of the environment as shown by the generated observation, would have a position and orientation relative to the state of the environment shown by the generated observation (e.g. relative to sand piles on a construction site) as its position and orientation (according to its reference pose) relative to the reference state of the environment.

In the following, various embodiments are described.

Embodiment 1 is a method for training a control policy for a robot device as described above.

Embodiment 2 is the method of embodiment 1, wherein each of at least some of the errors is the error between a pose estimation result provided by a pose estimation function of the robot device provided in response to sensor measurement data and a reference pose, wherein the sensor measurement data is sensor measurement data the robot device would obtain when in the reference pose disturbed by respective noise.

Thus, it can be achieved that the poses which are used for the training are poses that correspond to pose estimates that the robot device may in practical application come up with.

Embodiment 3 is the method of embodiment 2, wherein the sensor measurement data include measurement data of an inertial measurement unit of the robot device and image data from a camera observing the environment, and wherein the pose estimation function performs sensor fusion to determine the pose estimation result.

The errors (and thus the (training) poses) may then be generated by disturbing the inertial measurement unit measurements and taking the estimated poses resulting from the senor fusion as the training poses. This provides realistic training poses since in particular the inertial measurement unit measurements may be erroneous in practical application.

Embodiment 4 is a method of any one of embodiments 1 to 3, comprising performing a pose estimation (from e.g. training sensor measurement data) which outputs a pose estimation result uncertainty and generating at least some of the errors by sampling from a distribution of errors according to the pose estimation result uncertainty around the pose estimation result.

For example, the pose estimation result may be the output of a (extended) Kalman filter (EKF). The augmentations are then for example generated from the distribution of the EKF residual (e.g. a Gauß distribution given by the pose estimate as mean and the EKF covariance matrix estimate as covariance). The pose estimation is for example the one that is implemented by the robot device. Thus, training data elements are generated which are realistic to be encountered in operation of the robot device.

Embodiment 5 is the method of any one of embodiments 1 to 4, wherein the robot device is a construction vehicle and the environment is a construction site.

In particular in construction sites, pose estimate is difficult because of the uneven ground and because the environment is very noisy, hence sensors will provide noisy measurements, which leads to noisy pose estimates and thus, a training of a control policy which is robust against pose estimation errors is of particular advantage in such an environment.

Embodiment 6 is a method for controlling a robot device comprising training a control policy according to any one of embodiments 1 to 5, observing the environment to generate an observation, determining, by means of the trained control policy, one or more actions from the observation, estimating a pose of the robot device by the robot device and performing the one or more actions taking into account the estimated pose within the observed environment.

Embodiment 7 is a controller, configured to perform a method of any one of embodiments 1 to 6.

Embodiment 8 is a computer program comprising instructions which, when executed by a computer, makes the computer perform a method according to any one of embodiments 1 to 6.

Embodiment 9 is a computer-readable medium comprising instructions which, when executed by a computer, makes the computer perform a method according to any one of embodiments 1 to 6.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the disclosure. In the following description, various aspects are described with reference to the following drawings, in which:

FIG. 2A illustrates full state information of an agent.

FIG. 2B illustrates an observation derived from the true (correct) state of FIG. 2A.

FIG. 2C shows selected actions for the observation of FIG. 2B.

DETAILED DESCRIPTION

The following detailed description refers to the accompanying drawings that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

In the following, various examples will be described in more detail.

Figure 1:
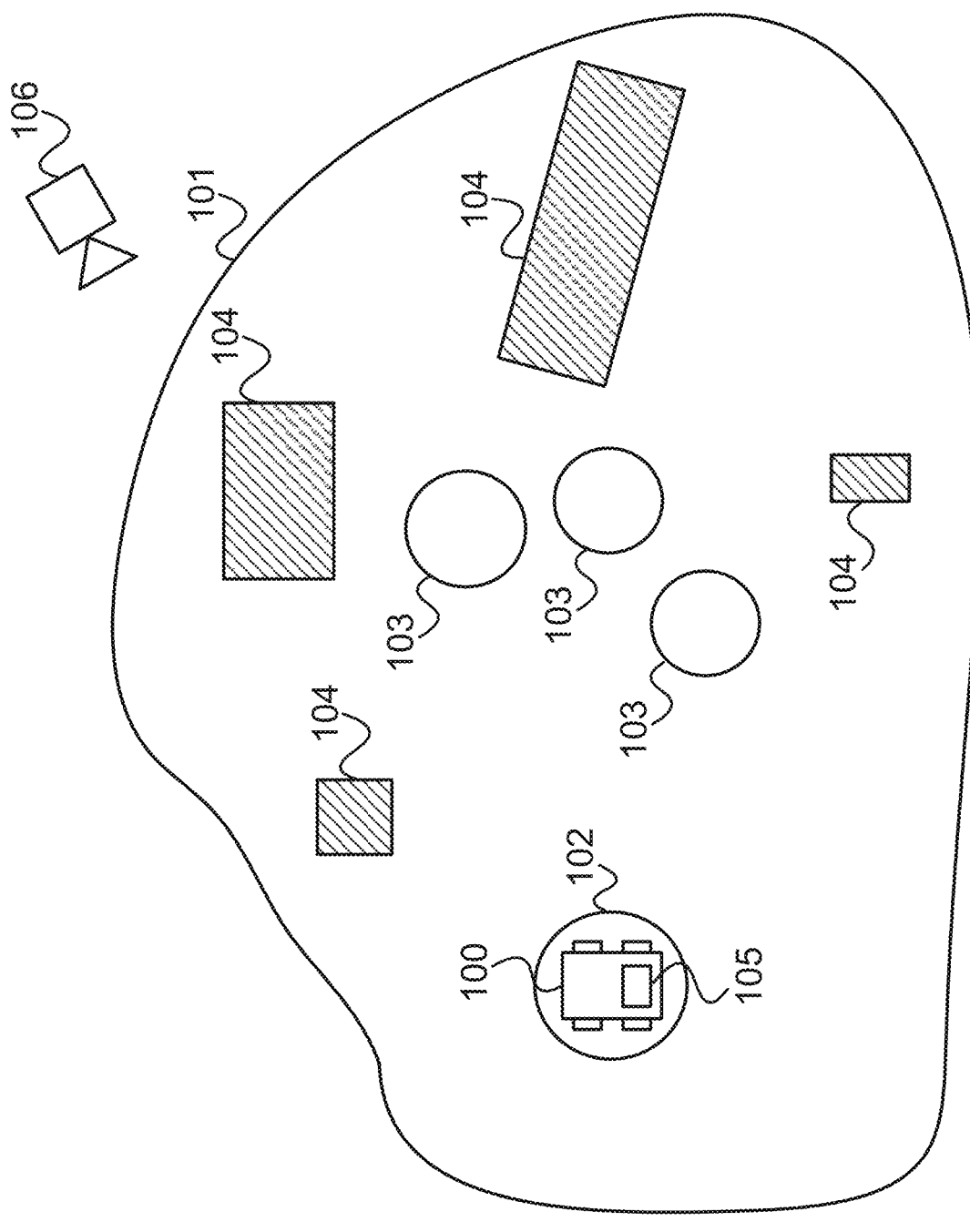
FIG. 1 shows a control scenario in a construction environment according to an embodiment.

FIG. 1 shows a control scenario in a construction environment 101.

A robot 100 is located in then environment 101. The robot 100 has a start position 102 and should for example clear sand piles 103. The environment 101 may also contain obstacles 104 which should be avoided by the robot 100. For example, they may not be passed by the robot 100 (e.g. they are walls, trees or rocks) or should be avoided because the robot would damage or hurt them (e.g. workers).

The robot 100 has a controller 105 (which may also be remote to the robot 100, i.e. the robot 100 may be controlled by remote control). The controller 105 can be seen to implement an agent which controls the robot 100. The terms "controller" and "agent" are used interchangeably in the following. In the exemplary scenario of FIG. 1, the goal is that the controller 105 controls the robot 100 to navigate the environment 101 to clear the sand piles 103, i.e. performs a grading task. In this example, the robot 100 is an autonomous dozer but it may also be a robot with legs or tracks or other kind of propulsion system (such as a deep sea or mars rover).

The controller (or agent) 105 controls the robot 100 from observations, i.e. it receives an observation (e.g. a height map that a camera 105 observes), chooses one or more actions for the observation and controls the robot 100 to perform the one or more actions (e.g. move in a certain direction by a certain distance).

In the following, approaches for autonomous path planning for construction site vehicles (generally robots in unstructured environments) are described. As example, as illustrated in FIG. 1, an autonomous grading task done by a dozer 100 under localization uncertainty is considered, where the estimated pose of the vehicle (dozer) is erroneous. This task poses several challenges which are common to all machinery tools in any construction site. Therefore, the addressed task can be considered as a representative example in the field. The main challenges include data collection which is a key difficulty for all machinery tools. Second, partial observability of the environment is extremely challenging as large portions of the environment are obscured due to sensor positioning. Third, sensory noise, which translates to localization uncertainty, affect the way the agent 105 uses observations of the environment 101 and thus causes significant performance degradation in the decision making process.

In order to overcome the difficulty of data collection, according to various embodiments, domain adaptation techniques may be used in order to bridge the simulation-to-real gap when training the agent 105 in a simulated environment. The simulation may be augmented to be as similar as possible to the real-world data. According to various embodiment a (control) policy for an agent 105 is learned (i.e. an agent is trained) purely in simulation and is tested in both simulation and in a scaled prototype environment.

In addition, according to various embodiments, the localization uncertainty is addressed by using a training regime where the uncertainty (e.g. due to sensory noise) is taken into account during the agent's policy training. This allows the agent 105 to learn a robust policy with improved performance under uncertainty during inference, compared to learning a policy in a clean, noise-less environment.

Specifically, the training dataset used to train the agent 105 includes augmentations to have many variations including scaled, rotated, and translated versions of (reference) observations, thus improving the agent's ability to cope with a more realistic scenario where the observation is uncertain due to localization errors.

The control of the dozer 100 can be modelled as a partially-observable Markov decision process (POMDP) which consists of a tuple $(\mathcal{S}, \mathcal{O}, \mathcal{A}, \mathcal{P}, \mathcal{R})$: the state $s \in \mathcal{S}$ contains all the required information in order to learn an optimal policy. However, the agent 105 is often provided with only partial or noisy information regarding the environment 101, which is termed as the observation $o \in \mathcal{O}$. Observations typically lack the sufficient statistics for optimality as opposed to states. At each state s, the agent 105 takes an action (i.e. controls the robot 100 according to a selected action) $a \in \mathcal{A}$. Then, the system (dozer 100 and environment 101) transitions to the next state s' based on the transition kernel P(s'|s, a). Finally, the agent is provided with a reward r (s, a). The goal of an agent is to learn a behaviour policy 7 that maximizes the cumulative reward, where the policy maps observations (or estimated states) to the actions.

According to various embodiments, the task of autonomous grading is formalized as a POMDP/R (i.e. a POMDP without the reward term), i.e. a 4-tuple is defined, consisting of states, observations, actions, and the transition kernel.

The state comprises all the information required to obtain the optimal policy and determines the outcome of each action. In the present example, the state includes the accurate pose of the agent (i.e. dozer) 100.

FIG. 2A illustrates the full state information of the agent 200 according to an embodiment, which includes exact knowledge (without errors) of its pose and knowledge about the environment 202 including the location of sand piles 201.

FIG. 2B illustrates an observation derived from the true (correct) state of FIG. 2A without errors where the observation includes a portion of the state information (here a portion 204 of the environment 202).

In the context of errors, two aspects of actions may be considered: (i—open loop selection) where the policy outputs a way-point for the dozer 100 to reach. Here, pose estimation errors are presented as sub-optimal projection from state to observation. (ii—closed loop) where errors in pose estimation are fed back to the dozer's low-level controller for trajectory execution. Here, errors propagate through the system leading to divergence from the desired path.

FIG. 2C shows selected actions as dots 205 (which define a path to take by the dozer 200 to clear the topmost sand pile 201).

State transitions are determined by a dozer's dynamics and physical properties of soil and the environment.

According to various embodiments, training observations (i.e. training inputs) are generate which comprise errors which reflect the uncertainty of the state determination caused by the measurement noise affecting the sensor data (a sensor for measuring of the dozer's pose in this example). In the present example, the inaccurate state (mainly pose) estimation translates to an erroneous bounding box view around the current location of the dozer 100.

For training (and testing), according to various embodiments, this behaviour is mimicked in simulation by applying augmentation (e.g. rotation and translation) to the true and accurate observation, i.e. an observation is generated in accordance with a (slightly) rotated and/or translated pose.

Figure 3:
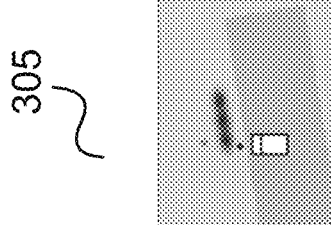
FIG. 3 illustrates an augmentation of policy inputs for a training dataset.
Figure 3:
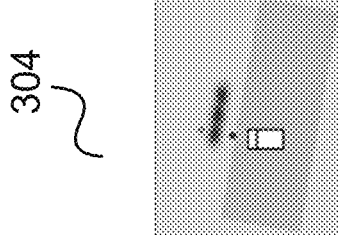
Figure 3:
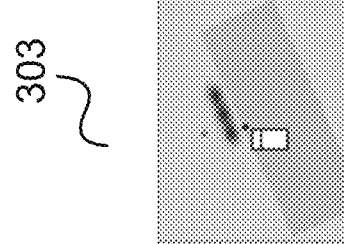
Figure 3:
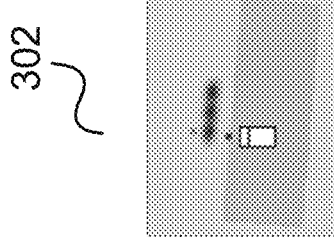
Figure 3:
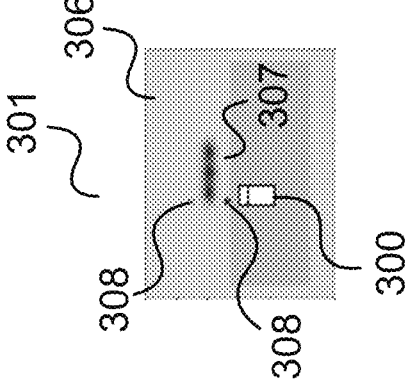

FIG. 3 illustrates the augmentation of policy inputs for a training dataset.

A first diagram 301 illustrates a reference training data element in which the dozer has a reference pose (i.e. a pose assumed to be the true pose for the training data in this example) of the dozer 300 in the environment 306. From this pose, the dozer has a certain observation (referred to as reference observation) of the environment. So, the reference observation case corresponds to the true state of the environment (here specifically including the location of sand piles 307) assumed for the training data element. The reference data element includes reference training labels, i.e.

a specification of one or more (reference) actions (here two actions, represented by dots 308, in the form of waypoints which define a path to clear one of the sand piles 307, wherein the dozer should first go to the point further away and then reverse to the nearer waypoint).

Further diagrams 302, 303, 304, 305 each represent a training data element corresponding to an augmented version of the reference observation. Each training data element corresponds to a disturbed pose (i.e. a specification of a pose which differs from the true pose of diagram 301), and thus a disturbed observation (e.g. height map) which is disturbed with respect to the reference observation.

Each training data element includes, as training labels, the reference training labels, i.e. specifies as ground truth actions that correspond to the true state such that the dozer is trained to perform a suitable action even if its pose estimation is erroneous.

Figure 4:
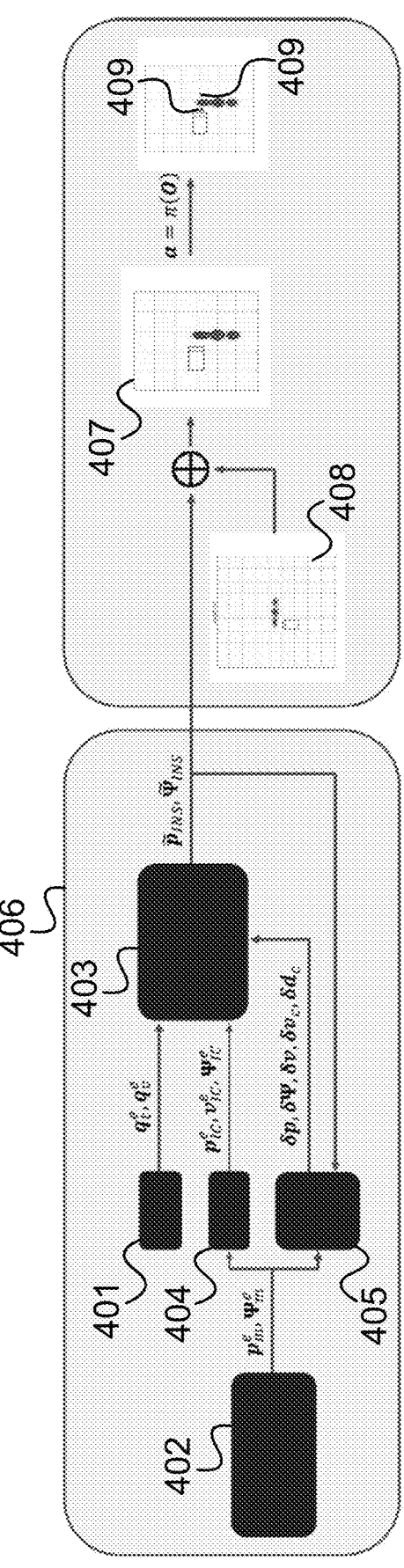
FIG. 4 illustrates the training of an agent according to various embodiments.

FIG. 4 illustrates the training of the agent 105 according to various embodiments.

In this example, a perception block 406 is used to generate pose estimations as it is included in the dozer 100.

Specifically, the agent 105 comprises an inertial measurement unit 401 which provides velocity and angular rate increments $$(q_t^e, q_v^e)$$

at high frequency. An interface 402 to the camera 105 (which is mounted somewhere at the construction site) provides aiding position and attitude (i.e. orientation) measurements, $$(p_m^e, \psi_m^e)$$

at low frequency, i.e. provides aiding information. The aiding information can also be provided by another device like a GNSS (Global Navigation Satellite System) receiver.

An inertial navigation system (INS) 403 uses the inertial sensor readings (from IMU 401) and initial conditions (IC) 404 to calculate the dozer's position, velocity, and orientation. According to an embodiment, a sensor fusion approach, using an extended Kalman filter (EKF) 405, is used to perform sensor fusion between the measurements from the IMU 401 and the measurements from the camera (received by the dozer via the camera interface 402).

So, the inertial integration system 403 uses both IC 404 and the measurements from IMU 401 to produce position and attitude estimates at high frequency, $(\tilde{p}_{INS}, \tilde{\Psi}_{INS})$ and, once an aiding measurement is available via the camera interface 402, the EKF 405 is activated to provide a corrected pose, bias and drift estimates. These estimates are fed back to the inertial integration system 403 for increment compensation. The output of the perception block 406 comprising those components is an estimate of the pose at high frequency.

When the perception block has estimated a pose for a training state (i.e. a true state of a reference training data element like illustrated in the first diagram 301 of FIG. 3), a corresponding training data element (like in represented by one of the second to fifth diagrams 302 to 305 of FIG. 3) is generated. This is done by feeding the estimated pose from the perception block 406 to a simulator in order to render an observation 407 from the true state 408 and the estimated pose by disturbing the correct observation corresponding to the true state according to the estimated pose, i.e. generating an observation (height map) that would be observed by the camera 105 if the dozer's estimated pose was its true pose. The training labels in the generated training data element is generated by giving the generated observation to an expert model.

Once the observation 407 is available, it is fed to the policy which provides actions 409 (i.e. way-points decisions). A loss is then calculated with respect to the training labels.

The simulator may then perform the provided actions, calculate the next true state (or set the simulation to another true state in another manner, e.g. by a reset after some iterations or by setting to another training scenario) and repeat the above process (i.e. perform multiple iterations) to calculate further losses (i.e. further components of a total training loss). The agent may then be trained to reduce the total training loss, e.g. the sum of losses batches of multiple iterations.

It should be noted that from a single pose estimate provided by the perception block 406 multiple training data elements may be generated by taking into account the pose uncertainty (from the EKF covariance matrix estimate), i.e.

$$\{\tilde{x}_k\}_{k=0}^{K-1} \sim \mathcal{N}(\tilde{x}, \Sigma)$$

Here, K is the number of observations that are rendered from the distribution about the estimate pose $\tilde{x}$ and $\mathcal{N}(\cdot, \cdot)$ is the normal distribution. In the above example, X corresponds to $(\tilde{p}_{INS}, \tilde{\Psi}_{INS})$, i.e. pose and orientation.

So, with a sensor fusion filtering like implemented by the perception block 401, many noisy (disturbed) observations (i.e. augmentations of true observations) may be generated. This may in particular be done by (i) adding synthetic noise to the inertial sensors of the inertial measurement unit (IMU) 401, and to the aiding sensor measurements (here the image data received via the interface 402), (ii) apply the inertial navigation system 403 (INS) and EKF 405 and (iii) render the noisy observations from the distribution produced by the filter 405. Doing so, uncertainties are introduced in the training pipeline. This enhances the training by leading to a training dataset which now includes a much wider distribution over potential states. This in turn allows the agent 105 to learn a policy that is more robust to localization uncertainty.

In practice, inserting sensory noise into the measurements translates to small perturbations around the respective true observation.

So, when the dozer estimates its pose in global coordinates (i.e. coordinates of the height map) and makes an error in the pose estimation (from errors in the sensor measurements) this can be seen as a corresponding shift or rotation of the height map as illustrated in FIG. 3 (since from the point of view of the dozer, the environment is shifted and/or rotated because it estimates its pose within the environment wrongly and therefore believes that the environment is shifted and/or rotated while it is itself which is shifted and/or rotated).

Figure 5:
FIG. 5 illustrates a flow diagram showing a method for training a control policy for a robot device, as disclosed herein.
Figure 5:
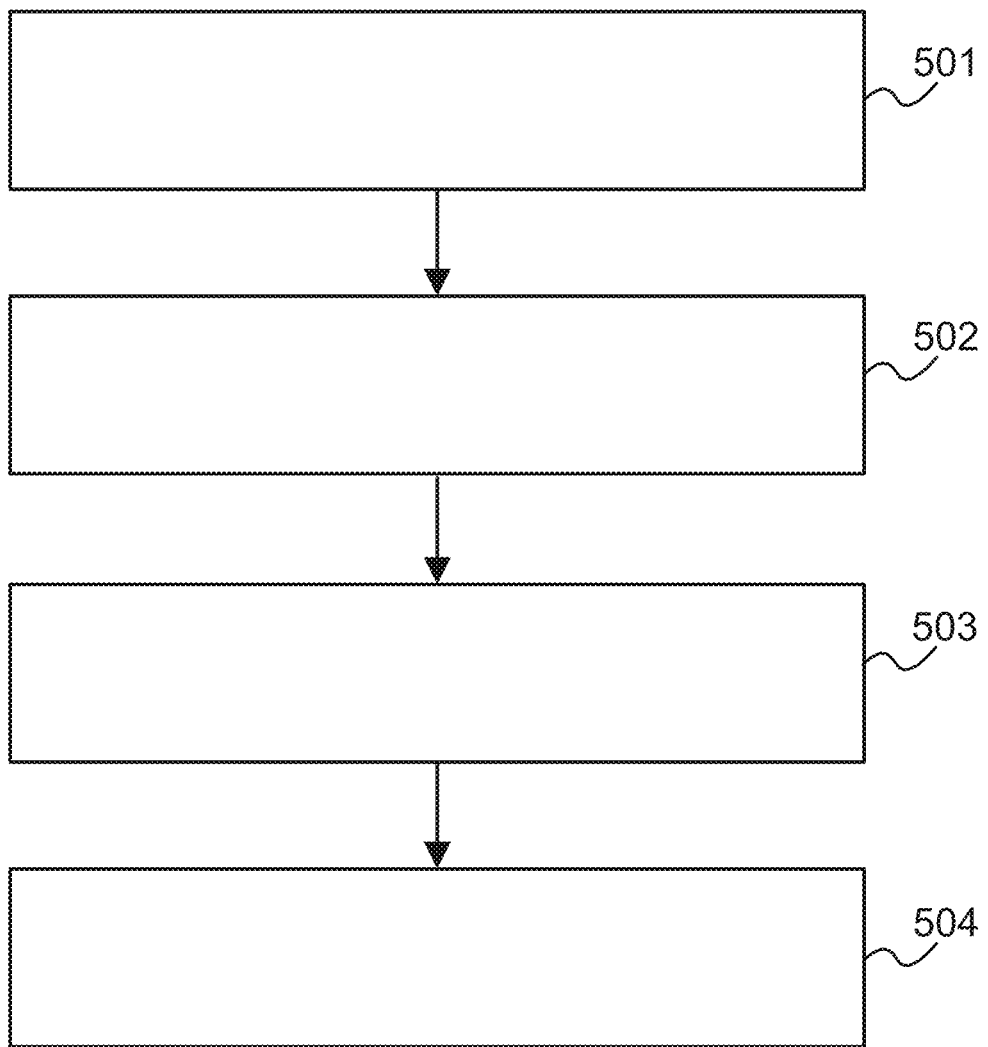

In summary, according to various embodiments, a method is provided as illustrated in FIG. 5.

FIG. 5 shows a flow diagram 500 illustrating a method for training a control policy for a robot device.

In 501, a reference state of an environment of the robot device and a reference observation of the environment for the reference state (i.e. reflecting the reference state) are acquired.

In 502, one or more reference actions are determined for the state.

In 503, for each of a plurality of errors of an estimation of a pose of the robot device, an observation that is disturbed with respect to the reference observation according to the error of the pose estimation is generated and a training data element comprising the generated observation as training input and the one or more reference actions as target output is generated.

In 504, the control policy is trained using the generated training data elements.

According to various embodiment, in other words, an agent is trained (or re-trained) with an augmented dataset. Specifically, the agent is presented with additional training data elements (from a distribution of training data elements) which it for example has not previously met in the training. The additional training data elements improve scale and rotation in-variance of the control policy implemented by the agent. For examples, as described above the location of the agent (dozer) is disturbed with respect to sand-piles, allowing it to learn to make better decisions at inference.

As explained above, the training data elements (i.e. the training observations, i.e. training inputs, they include) may be rendered for various poses from the "true" state (corresponding to the correct observation for which the actions labels are given). Providing the agent with several observations for the same ("true") state, derived from many poses, improves the agents' robustness to scale and rotation.

The approach of FIG. 5 can be used to train an agent to compute a control signal for controlling a technical system where a pose is taken into account, like e.g. a computer-controlled machine, like a robot, a vehicle, a domestic appliance, a power tool, a manufacturing machine, a personal assistant or an access control system. According to various embodiments, a policy for controlling the technical system may be learnt and then the technical system may be operated accordingly.

Various embodiments may receive and use image data (i.e. digital images) from various visual sensors (cameras) such as video, radar, LiDAR, ultrasonic, thermal imaging, motion, sonar etc., e.g. for obtaining the observations.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the disclosure. This application is intended to cover any adaptations or variations of the specific embodiments discussed herein. Therefore, it is intended that this disclosure be limited only by the claims and the equivalents thereof.

What is claimed is:

1. A method for controlling a robot device comprising:
training a control policy for the robot device including (i) acquiring a reference state of an environment of the robot device, the reference state including reference locations of obstacles in the environment and a reference pose of the robot device within the environment; (ii) acquiring a reference observation of the environment for the acquired reference state; (iii) determining a reference action for the acquired reference state, the reference action including a movement of the robot device in a particular direction by a particular distance; (iv) generating a plurality of errors of an estimation of a pose of the robot device, each error in the plurality of errors being a shift or rotation of the reference pose of the robot device; (v) generating a plurality of training observations corresponding to the plurality of errors, each respective training observation in the plurality of training observations being generated by disturbing the a the acquired reference observation according to a corresponding error of the corresponding pose estimation; and (vi) training the control policy using the generated plurality of training observations as training inputs and the reference action as a target output, to determine actions to be performed by the robot device based on observations of the environment;

observing the environment to generate a measured observation;

determining, using the trained control policy, an action from the measured observation, the action including a movement of the robot device in a particular direction by a particular distance;

estimating a pose of the robot device by the robot device; and controlling the robot device to perform the action taking into account the estimated pose within the observed environment.

2. The method of claim 1, wherein a controller is configured to perform the method.

3. The method of claim 1, wherein a computer program includes instructions which, when executed by a computer, makes the computer perform the method.

4. The method of claim 1, wherein a non-transitory computer-readable medium includes instructions which, when executed by a computer, makes the computer perform the method.

5. The method of claim 1, the generating the plurality of errors further comprising:

determining sensor measurement data that the robot device would obtain when in the reference pose disturbed by respective noise; and determining each error of the plurality of errors as an error between (i) a pose estimation result provided by a pose estimation function of the robot device provided in response to the sensor measurement data and (ii) the reference pose.

6. The method of claim 5, wherein:

the sensor measurement data include measurement data of an inertial measurement unit of the robot device and image data from a camera observing the environment, and the pose estimation function performs sensor fusion to determine the pose estimation result.

7. The method of claim 1, the generating the plurality of errors further comprising:

performing a pose estimation which outputs a pose estimation result uncertainty; and generating at least some of the errors of the plurality of errors by sampling from a distribution of errors according to the pose estimation result uncertainty around the pose estimation result.

8. The method of claim 1, wherein the robot device is a construction vehicle and the environment is a construction site.

* * * * *